J. F. GIBSON.
HULLING-MACHINE.
No. 178,429.	Patented June 6, 1876.
Fig. 1.
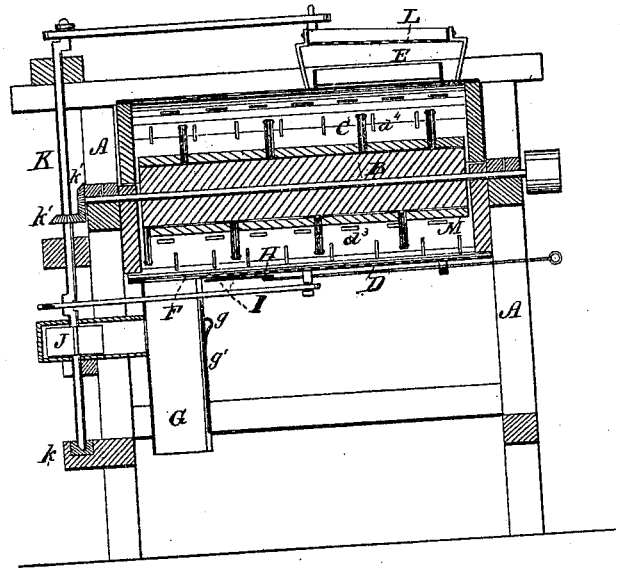
Fig. 2.
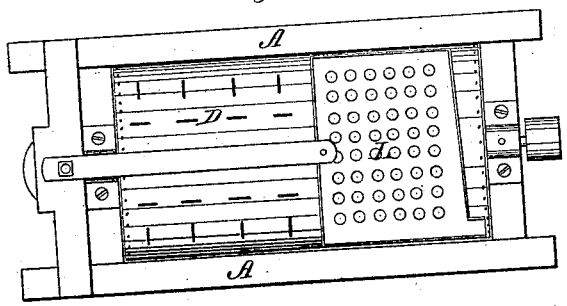
Fig. 3.	Fig. 4.
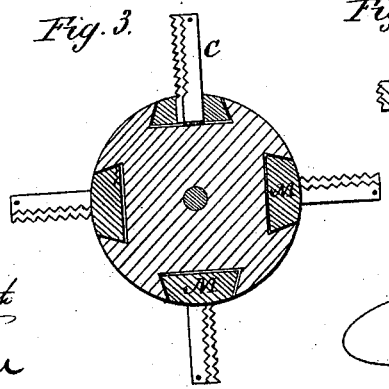
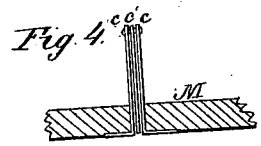
WITNESSES:	INVENTOR:
W. W. Hollingsworth	Jacob F. Gibson
	BY
	ATTORNEYS.

UNITED STATES PATENT OFFICE

JACOB F. GIBSON, OF BRYANSVILLE, PENNSYLVANIA.

IMPROVEMENT IN HULLING-MACHINES.

Specification forming part of Letters Patent No. 178,429, dated June 6, 1876; application filed April 26, 1876.

*To all whom it may concern:*

Be it known that I, JACOB F. GIBSON, of Bryansville, in the county of York and State of Pennsylvania, have invented a new and Improved Hominy and Wheat Huller and Cleaner; and I do hereby declare that the following is a full, clear, and exact description of the same, reference being had to the accompanying drawing, forming part of this specification, in which—

Figure 1 is a sectional elevation; Fig. 2, a plan view; and Figs. 3, 4 detail views in section.

The invention consists in rotating a shaft, provided with rows of triturators shaped like saw-blades, within a perforated or slotted cylinder that is inclined and has a reciprocating or movable bottom as well as a sliding gate; also, in the novel mode of constructing the triturators so that they can be very readily applied and removed for sharpening.

A represents a suitable frame, in which is journaled the rotary shaft B, having rows of serrated or saw-shaped triturators C, arranged so that the corresponding ones of no two adjacent rows shall be opposite, but shall be placed intermediately. D is an inclined cylinder surrounding the shaft B, the lower section being secured rigidly to frame while the upper one is detachable and overlaps the lower, when it is fastened down by the hooks and catches. This cylinder also is slotted or apertured at $d^3$ $d^4$ to enable the dust from the grain to escape; has a superposed hopper, E, opening thereinto to conduct the grain into the huller and a discharge, F, to which is attached a pendent spout, G. In the lower section is placed a slotted or perforated and reciprocating bottom, H; also, a sliding gate, I, which may be closed entirely, or to any desired degree. On one side of the spout G is arranged a blast-fan, J, that blows across and through an opposite opening, $g$, of spout, so as to clean the grain from any adhering matter after it passes from the cylinder. The opening $g$ is provided with a slide-plate, $g'$, so as to graduate the effect of the blast. K is a perpendicular shaft journaled in a step, $k$, at the bottom, carrying the fan, and also connected by bevel-wheels $k^1$ $k^2$ with shaft B, so as to rotate the latter simultaneously with the fan. L represents a coarse sieve placed over hopper E and used in connection with the machine, whenever grain is to be passed through the mill, for the purpose of arresting straw. The grain then passes into cylinder, where it is agitated and rubbed by the rotary action of the triturators C until the hull is removed and the dust to a great extent forced through the holes of cylinder, when it is caused to pass down the incline and out at the discharge F by the reciprocating motion of the slotted bottom. As it passes through the spout G the fan removes any remaining dust or other adhering matter. Whenever the cuticle of hominy is to be eliminated, the top sieve is detached and the bottom gate closed entirely, the machine being continuously operated until, by examination, it is found to be denuded of the skin.

The triturators C are of a very peculiar construction, and form an important part of my invention, being specially adapted for attachment in a cheap and efficient manner. They are in three metallic parts, $c$, $c$, and $c'$, the latter being in the middle and shorter than the others. The upper ends of the long parts, after being passed through a hole in the stock M, are bent in opposite directions so as to overlap the stock and hold fast to it, but so that they can be readily detached in order to have the teeth conveniently sharpened. The stock M works in a dovetailed groove of the shaft B, and are thus securely held, while there is no difficulty of removal whenever there is an occasion for it.

Having thus described my invention, what I claim as new is—

1. The combination of a rotary shaft, B, having rows of triturators C, with an inclined cylinder, D, having hopper E at the top of upper end, discharge F at the bottom of lower end, reciprocating bottom H, and sliding gate I, all arranged as and for the purpose described.

2. The triturators C, made of three saw-blades, the middle one shorter than the outer ones, to adapt them to be fastened to stock in the manner described.

The above specification of my invention signed by me this 20th day of April, 1876.

JACOB F. GIBSON.

Witnesses:
 SOLON C. KEMON,
 CHAS. A. PETTIT.